US012637095B2

(12) United States Patent
Shirai et al.

(10) Patent No.: US 12,637,095 B2
(45) Date of Patent: May 26, 2026

(54) DRIVER ASSISTANCE CONTROL DEVICE, DRIVER ASSISTANCE METHOD, AND NON-TRANSITORY COMPUTER STORAGE MEDIUM

(71) Applicant: TOYOTA JIDOSHA KABUSHIKI KAISHA, Aichi-ken (JP)

(72) Inventors: Ryo Shirai, Toyota (JP); Makoto Maehara, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/318,372

(22) Filed: Sep. 4, 2025

(65) Prior Publication Data

US 2026/0109367 A1 Apr. 23, 2026

(30) Foreign Application Priority Data

Oct. 18, 2024 (JP) ................................. 2024-184246

(51) Int. Cl.
| | |
|---|---|
| *B60W 50/08* | (2020.01) |
| *B60W 50/14* | (2020.01) |
| *G06V 20/59* | (2022.01) |
| *G06V 40/16* | (2022.01) |
| *B60W 50/00* | (2006.01) |

(52) U.S. Cl.
CPC .......... *B60W 50/082* (2013.01); *B60W 50/14* (2013.01); *G06V 20/597* (2022.01); *G06V 40/161* (2022.01); *B60W 2050/0095* (2013.01); *B60W 2540/225* (2020.02); *B60W 2540/229* (2020.02); *B60W 2552/05* (2020.02)

(58) Field of Classification Search
CPC ............. B60W 50/082; B60W 50/085; B60W 2540/225; B60W 2540/229; B60W 2552/05; B60W 2050/0095; G06V 20/597; G06V 40/161
See application file for complete search history.

(56) References Cited

U.S. PATENT DOCUMENTS

| | | | |
|---|---|---|---|
| 2021/0357670 A1* | 11/2021 | Wu | G06V 20/56 |
| 2022/0063634 A1 | 3/2022 | Sato et al. | |
| 2024/0404404 A1* | 12/2024 | Rouhi | G08G 1/012 |

FOREIGN PATENT DOCUMENTS

JP 2022-038604 A 3/2022

* cited by examiner

*Primary Examiner* — Jason D Shanske
*Assistant Examiner* — Matthew James O'Neill
(74) *Attorney, Agent, or Firm* — HAUPTMAN HAM, LLP

(57) ABSTRACT

A vehicle is capable of selecting one driving mode from among a plurality of driving modes including a first driving mode for normal driving and a second driving mode for rough road driving. A control device for the vehicle is configured to monitor a driver of the vehicle and perform a notification regarding distracted driving to the driver and, when the driving mode is the second driving mode, suppress the notification regarding distracted driving compared to when the driving mode is the first driving mode.

5 Claims, 5 Drawing Sheets

IN FIRST DRIVING MODE

IN SECOND DRIVING MODE (IN THE SECOND DRIVING MODE, REDUCE THE AREA DETERMINED AS DISTRACTED DRIVING)

DRIVER ASSISTANCE CONTROL DEVICE, DRIVER ASSISTANCE METHOD, AND NON-TRANSITORY COMPUTER STORAGE MEDIUM

FIELD

The present disclosure relates to a driver assistance control device, driver assistance method, and non-transitory computer storage medium.

BACKGROUND

Japanese Unexamined Patent Publication No. 2022-38604 discloses a conventional vehicle control device in which a boundary that separates a safety range and an unsafe range is changed in accordance with a driving environment such as a road surface state, and if a driver's gaze stays in the unsafe range, it is determined that dangerous driving is performed and perform warning.

SUMMARY

When driving on rough roads such as sandy land, gravel roads, ice and snow roads, muddy roads, rocky terrain, and off-roads, it is sometimes necessary to drive vehicles while checking the surroundings. However, the conventional vehicle control device described above is configured such that the safety range is relatively narrowed as the road surface condition deteriorates. For this reason, there is a possibility that an excessive distracted driving warning is given to the driver during the rough road driving.

The present disclosure was made focusing on such a problem and has as its object to prevent an excessive notification regarding distracted driving to a driver.

To solve this problem, according to one aspect of the present invention, there is provided a control device for the vehicle. The vehicle is capable of selecting one driving mode from among a plurality of driving modes including a first driving mode for normal driving and a second driving mode for rough road driving. The control device is configured to monitor a driver of the vehicle and perform a notification regarding distracted driving to the driver and, when the driving mode is the second driving mode, suppress the notification regarding distracted driving compared to when the driving mode is the first driving mode.

Further, according to another aspect of the present disclosure, there is provided a driver assistance method for a vehicle capable of selecting one driving mode from among a plurality of driving modes including a first driving mode for normal driving and a second driving mode for rough road driving. The driver assistance method includes monitoring a driver of the vehicle and performing a notification regarding distracted driving to the driver; and, when the driving mode is the second driving mode, preventing the notification regarding distracted driving compared to when the driving mode is the first driving mode.

Further, according to another aspect of the present disclosure, there is provided a non-transitory computer storage medium including a computer program for making a computer run processing for monitoring a driver of a vehicle capable of selecting one driving mode from among a plurality of driving modes including a first driving mode for normal driving and a second driving mode for rough road driving and performing a notification regarding distracted driving to the driver; and, when the driving mode is the second driving mode, preventing the notification regarding distracted driving compared to when the driving mode is the first driving mode.

According to these aspects of the present disclosure, it is possible to prevent an excessive notification regarding distracted driving to a driver.

DESCRIPTION OF EMBODIMENTS

Figure 1:
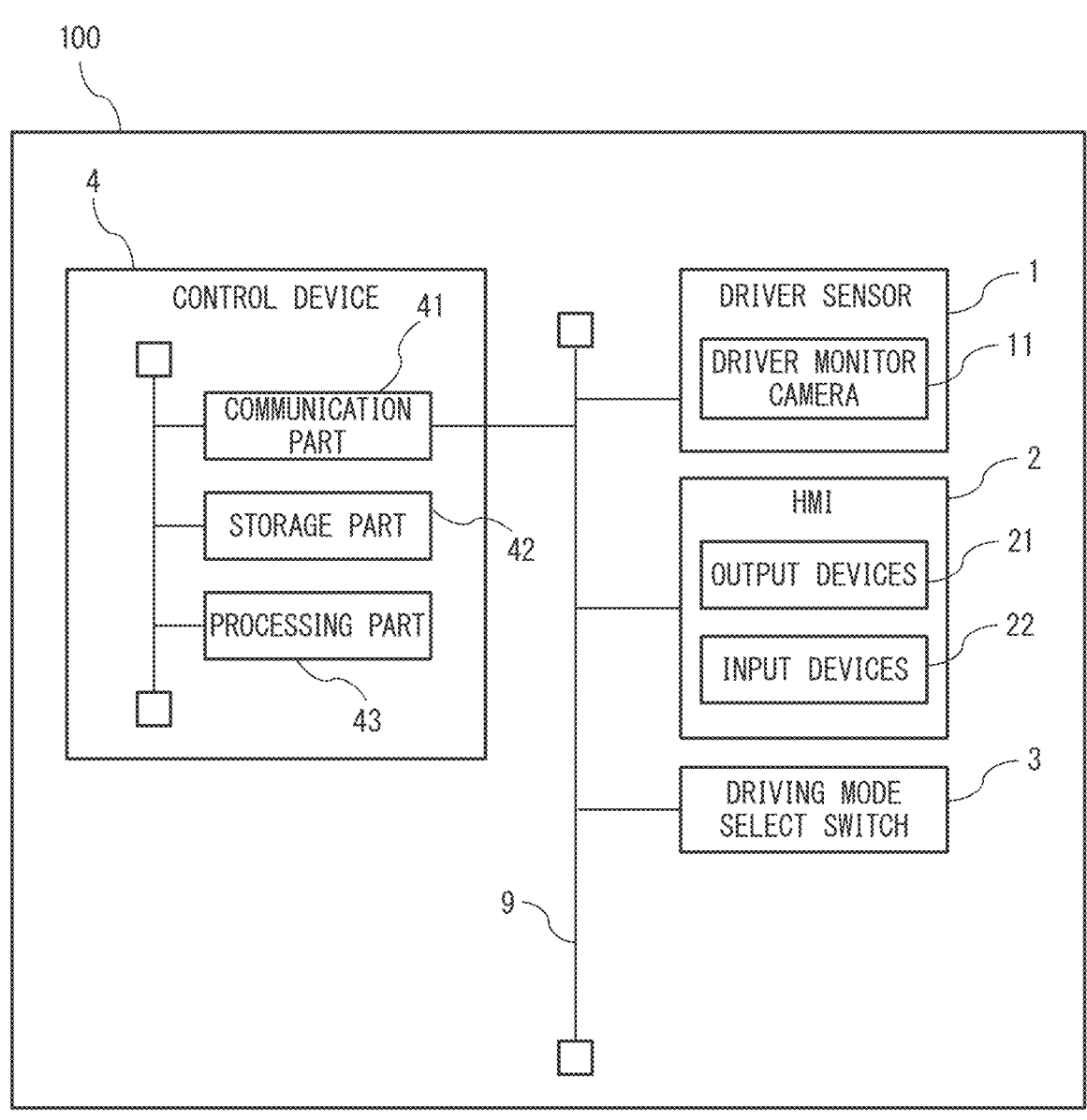
FIG. 1 is a schematic view of the configuration of a vehicle according to a first embodiment of the present disclosure.

Below, referring to the drawings, an embodiment of the present disclosure will be explained in detail. It should be noted that, in the following explanation, similar component elements are assigned the same reference notations.

First Embodiment

FIG. 1 is a schematic view of the configuration of a vehicle 100 according to one embodiment of the present disclosure.

The vehicle 100 is provided with driver sensor 1, an HMI (human machine interface) 2, a driving mode select switch 3, and a control device 4. The driver sensor 1, HMI 2, driving mode select switch 3, and the control device 4 are connected to be able to communicate through an internal vehicle network 9 based on a standard such as a Control Area Network.

The driver sensor 1 is a sensor for generating driver data showing the state of the driver. In the present embodiment, as the driver sensor 1, a driver monitor camera 11 for capturing the appearance of the driver including the face of the driver is provided. The driver monitor camera 11 captures the appearance of the driver by a predetermined frame rate (for example, 10 Hz to 40 Hz) and generates appearance image showing the appearance of the driver. Each time the driver monitor camera 11 generates an appearance image of the driver, it sends the generated appearance image as driver data to the control device 4.

The HMI 2 is a user interface for transfer of information between the vehicle 100 and its occupants. The HMI 2 is provided with output devices 21 for providing notifications to the vehicle occupants through the physical senses (for example, sight, hearing, touch, etc.) of the vehicle occupants and input devices 22 for the vehicle occupants to perform input operations and response operations. In the present embodiment, as output devices 21, a display (for example, meter display, center display, heads-up display, etc.) and speakers are provided. As the input devices 22, a touch panel and microphone are provided.

The HMI 2 displays information (for example, text information or graphic information) corresponding to a display signal received from the control device 4 on the display and outputs audio corresponding to an audio signal from the speakers.

The HMI 2 may be mounted in the vehicle 100 in advance or may be a smartphone or other terminal held by a vehicle occupant. In the latter case, for example, information may be transferred by short distance wireless between the vehicle 100 and terminal of the vehicle occupant, the terminal of the vehicle occupant and an outside server (not shown) may communicate with each other, and information may be transferred indirectly through the server.

The driving mode select switch 3 is a switch for switching the driving mode of the vehicle 100 to an arbitrary driving mode. The driving mode select switch 3 is configured to be able to switch the driving mode to at least a first driving mode for normal driving and a second driving mode for rough road driving. The driving mode select switch 3 transmits information on the selected driving mode to the control device 4 as driving mode data. The first driving mode is a driving mode suitable for driving (normal driving) of the vehicle 100 in a general driving environment such as a paved road. The second driving mode is a driving mode suitable for a rough road driving, for example, sandy land, gravel roads, ice and snow roads, muddy roads, rocky terrain, off-road, etc., which requires a particularly large driving force compared with normal driving.

The driving mode select switch 3 according to the present embodiment is a transfer switch for switching the operating state of the drive system of the vehicle 100, and can switch the driving mode between a H4 mode for normal driving and a L4 mode for driving on a rough road in which the respective wheels (all wheels) can be driven at a higher torque than in the H4 mode by switching the transmission inside the transfer to the low range gear.

The control device 4 is an ECU (electronic control unit) provided with a communication part 41, storage part 42, and processing part 43.

The communication part 41 is provided with an interface circuit for connecting the control device 20 to the internal vehicle network 9. The communication part 41 supplies the various data received from the driver sensor 1, the HMI 2 and the driving mode select switch 3, etc. to the processing part 43. Further, the communication part 41 outputs the various signals output from the processing part 43 to the HMI 2, etc.

The storage part 42 has an HDD (hard disk drive) or SSD (solid disk drive), semiconductor memory, or other storage medium and stores various computer programs or data etc. used for processing at the processing part 43.

The processing part 43 has one or more CPUs (central processing units) and their peripheral circuits and runs the various computer programs stored in the storage part 42. The processing part 43 is, for example, a processor. The processing part 43 may further have another processing circuit such as a logical operation unit, numerical operation unit, or graphic processing unit. As an example of the processing performed by the processing part 43, for example, the processing part 43 monitors the driver to detect whether the driver is driving distracted, and when it can be determined that the driver is driving distracted, performs distracted driving notification processing for notifying the driver about distracted driving such as a warning via the output device 21.

When driving on rough roads such as sandy land, gravel roads, ice and snow roads, muddy roads, rocky terrain, and off-roads, the vehicle 100 may need to be driven while checking the surroundings for safety. Therefore, if the driver is monitored and a notification is given to the driver regarding distracted driving, there is a risk that the notification to the driver regarding distracted driving may be given excessively when driving on a rough road. As a result, there is a risk that the driver may feel troublesome in the notification regarding distracted driving.

Therefore, in the present embodiment, the execution of the notification regarding distracted driving to the driver is prevented when driving on a rough road. Below, the contents of the distracted driving notification processing performed by the processing unit 43, and hence the control device 4, will be described with reference to FIG. 2 and the like.

Figure 2:
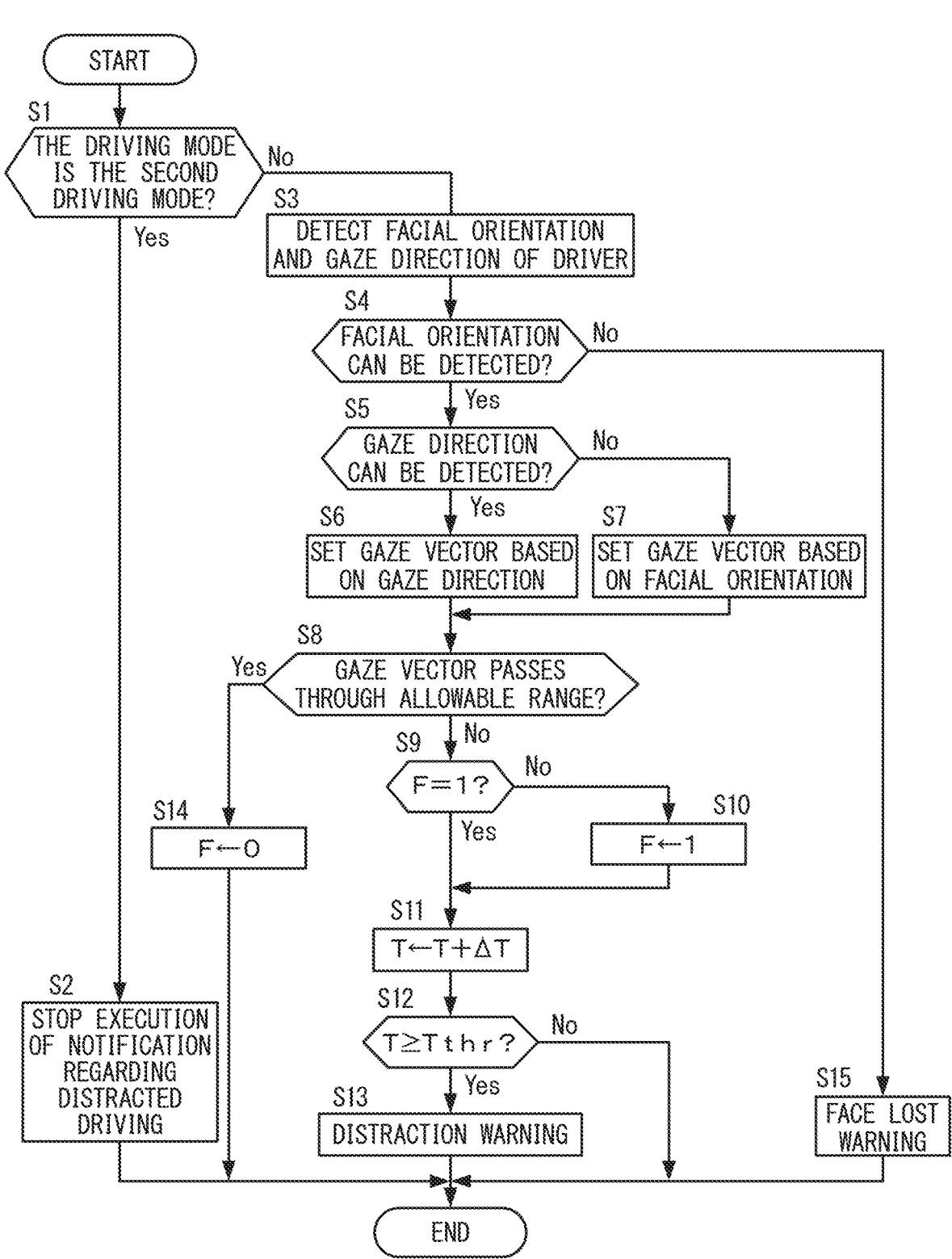
FIG. 2 is a flowchart for explaining details of a distracted driving notification processing according to a first t embodiment.

FIG. 2 is a flowchart for explaining details of the distracted driving notification processing according to the present embodiment. For example, the control device 4 executes this routine every time the appearance image of the driver is received from the driver monitor camera 11.

At step S1, the control device 4 determines whether the driving mode is the second driving mode. If the driving mode is the second driving mode, the control device 4 proceeds to the process of step S2. On the other hand, if the driving mode is not the second traveling mode, the control device 4 proceeds to the process of step S3.

At step S2, the control device 4 stops the execution of the notification regarding distracted driving to the drivers. In the present embodiment, the control device 4 performs a distracted driving warning via the output device 21 as the notification regarding distracted driving to the driver, and thus stops the execution of the distracted driving warning.

At step S3, the control device 4 detects the facial orientation of the driver and the gaze direction of the driver based on the appearance image of the driver received from the driver monitor camera 11.

It should be noted that, the method of detection of the facial orientation and gaze direction of the driver is not particularly limited, the control device 4, for example, can analyze the appearance image of a driver to detect the portions of the eyes, nose, mouth, or other features of the face of the driver and compare the positions of these against 3D models of standard faces stored in the memory part 62 to detect the facial orientation of the 3D model with portions of facial features matching the most as the facial orientation of the driver. Further, the distracted driving judgment part 72, for example, can analyze the appearance image of the driver to detect the position of the center of a pupil as a moving point (that is, the viewpoint position of the driver) and the position of the Purkinje image (cornea reflected image) used as the reference point and detect the gaze direction of the driver based on the positional relationship of the Purkinje image and pupil center (position of moving point with respect to reference point).

At step S4, the control device 4 determines whether the facial orientation of the driver can be detected. If the control device 4 can detect the facial orientation of the driver, it proceeds to the processing of step S5. On the other hand, if the control device 4 cannot detect the facial orientation of the driver, it proceeds to the processing of step S14.

At step S5, the control device 4 determines whether the gaze direction of the driver can be detected. If the control device 4 can detect the gaze direction of the driver, it proceeds to the process in step S6. On the other hand, if the control device 4 cannot detect the gaze direction of the driver, it proceeds to the process in step S7.

At step S6, the control device 4 sets the gaze vector based on the gaze direction of the driver. In the present embodiment, the control device 4 sets a vector extending from the position of the eye of the driver (viewpoint position) toward the gaze direction as the gaze vector.

At step S7, the control device 4 sets the gaze vector based on the facial orientation of the driver. In the present embodiment, the control device 4 sets a vector extending toward the direction of facial orientation of the driver as the gaze vector.

Figure 3:
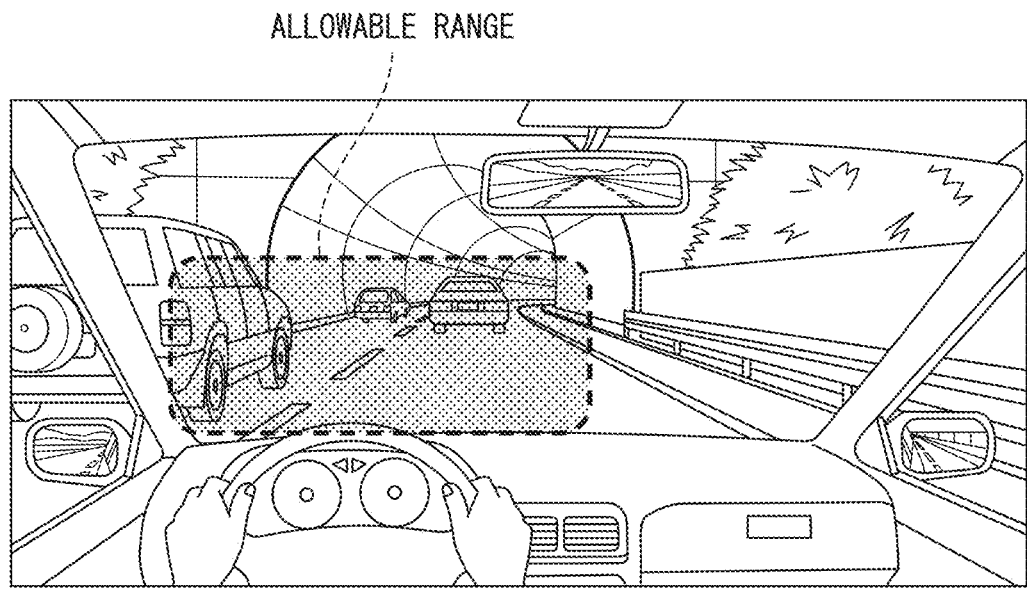
FIG. 3 is a view showing an allowable range of a gaze vector according to a first embodiment of the present disclosure.

At step S8, the control device 4 determines whether the gaze vector passes through an allowable range, as shown in FIG. 3, virtually set at a predetermined position at the front in the direction of vehicle advance and having a predetermined height and width. If the gaze vector passes through the allowable range, the control device 4 determines that the driver is not in the state of distracted driving and proceeds to the processing of step S14. On the other hand, if the gaze vector does not pass through the allowable range, the control device 4 determines that the driver is in the state of distracted driving and proceeds to the processing of step S9.

At step S9, the control device 4 determines whether a distraction continuation flag F is set to 1. The distraction continuation flag F is a flag set to 1 when the distracted driving begins. The initial value of the distraction continuation flag F is set to 0. If the distraction continuation flag F is set to 1 (i.e., distracted driving has continued from the previous process), the control unit 4 proceeds to the processing of step S11. On the other hand, if the distraction continuation flag F is set to 0 (i.e., distracted driving is detected for the first time in the current process), the control unit 4 proceeds to the processing of step S10.

At step S10, the control device 4 sets the distraction continuation flag F to 1.

At step S11, the control device 4 increases a distraction continuation time T by a predetermined time ΔT. In the present embodiment, the predetermined time ΔT corresponds to the reception cycle of the appearance image of the driver.

At step S12, the control device 4 determines whether the distraction continuation time T is equal to or greater than the distraction determination time Tthr. The distraction determination time Tthr can be set to any value, and in the present embodiment, it is set to 5 seconds. If the distraction continuation time T is equal to or greater than the distraction determination time Tthr, the control device 4 proceeds to the processing of step S13. On the other hand, if the distraction continuation time T is less than the distraction determination time Tthr, the control device 4 ends the current processing.

At step S13, the control device 4 performs a distraction warning to the driver via the output device 21. The method and content of the distraction warning are not particularly limited; for example, the warning may be given by making an announcement via voice, by emitting a warning sound, by displaying image or text information on a display, or by a combination of these methods.

At step S14, the control device 4 sets the distraction continuation flag F to 0.

At step S15, the control device 4 the control device 4 performs a warning to the driver via the output device 21 that a face of the driver cannot be recognized. The method and content of this warning are not particularly limited and can be carried out in a manner similar to a distraction warning, for example.

The vehicle 100 according to the present embodiment explained above is capable of selecting one driving mode from among a plurality of driving modes including a first driving mode for normal driving and a second driving mode for rough road driving. The control device (driver assistance control device) 4 of the vehicle 100 is configured to monitor a driver of the vehicle and perform a notification regarding distracted driving to the driver and, when the driving mode is the second driving mode, prevent the notification regarding distracted driving compared to when the driving mode is the first driving mode. Specifically, the control device 4 is configured to, when the driving mode is the second driving mode, prevent the notification regarding distracted driving compared to when the driving mode is the first driving mode by stopping the notification regarding distracted driving.

Due to this, when the driving mode is set to the second driving mode for rough road driving, the notification regarding distracted driving is prevented. Therefore, it is possible to prevent excessive notifications to the driver regarding distracted driving in a situation where the driver must drive while checking the surroundings at a low speed for safety. Consequently, it is possible to prevent the driver from feeling annoyed by the notification regarding distracted driving.

Second Embodiment

Next, a second embodiment of the present invention will be explained. The present embodiment differs from the first embodiment in that it prevents the notification regarding distracted driving during rough road driving by changing at least one of the size of the allowable range for distraction judgment and the length of the distraction determination time Tthr. Below, the points of difference will be focused on in the explanation.

Figure 4:
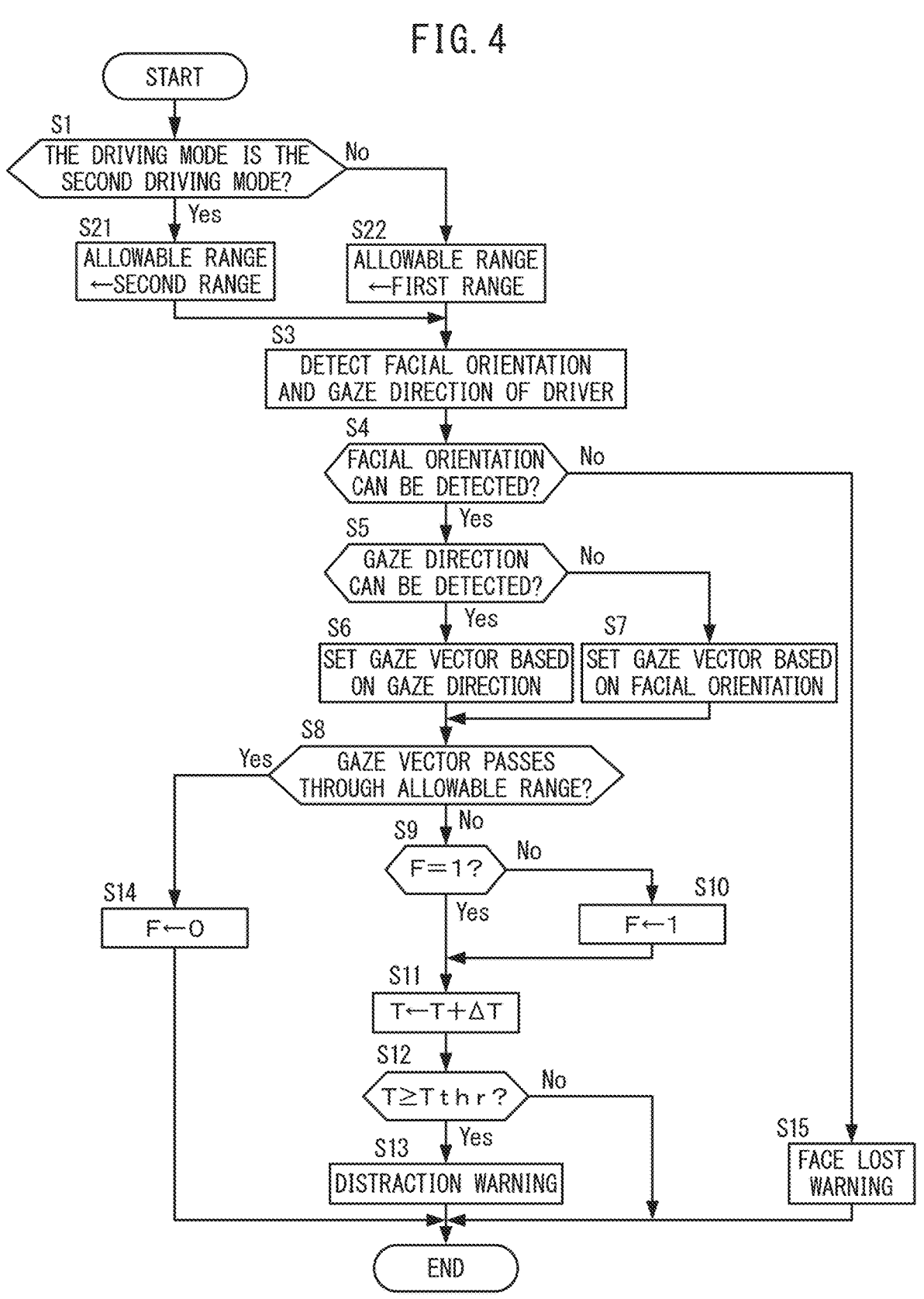
FIG. 4 is a flowchart for explaining details of a distracted driving notification processing according to a second embodiment of the present disclosure.

FIG. 4 is a flow chart for explaining details of the distracted driving notification processing according to the present embodiment. FIG. 4 is similar to the first embodiment in the content of the processing from step S1 to step S15, so here the explanation will be omitted.

At step S21, the control device 4 enlarges the allowable range for t the facial orientation or the gaze direction of the driver compared to when it is not in the second driving mode. In the present embodiment, as shown in FIG. 5, the control device 4 sets the allowable range to a second range that is larger than the first range set when it is not in the second driving mode.

It should be noted that, in this embodiment, by changing the size of the allowable range in this manner, the implementation of the notification regarding distracted driving during rough road driving is prevented. However, for example, in the second driving mode, the distraction determination time Tthr may be set longer than when not in the second driving mode, or both the allowable range and the distraction determination time Tthr may be modified.

Figure 5:
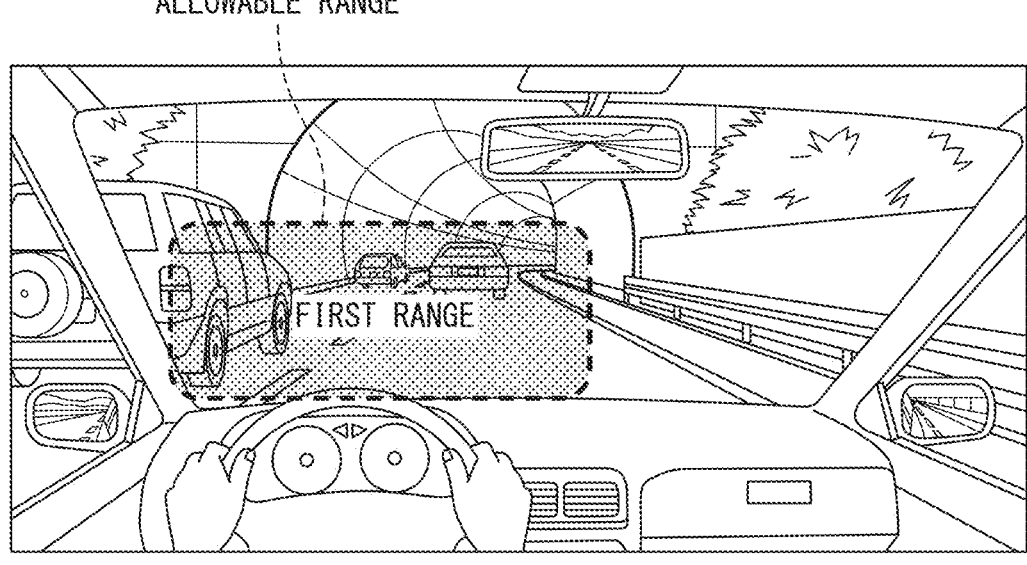
FIG. 5 is a view showing an allowable range of a gaze vector according to a second embodiment of the present disclosure.
Figure 5:
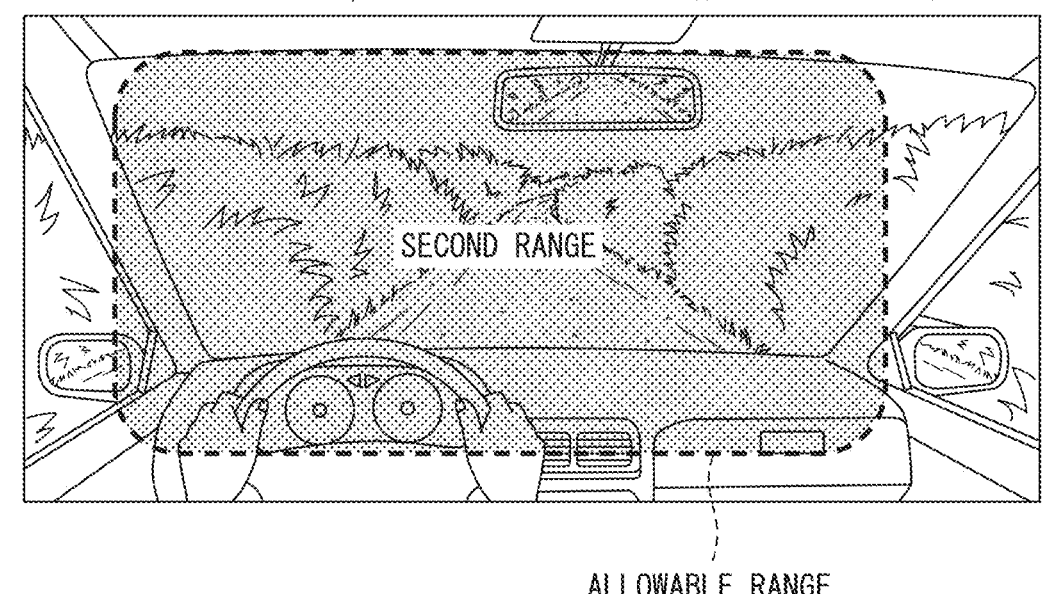

At step S22, the control device 4 sets the allowable range to the first range, as shown in FIG. 5.

The control device 4 for the vehicle 100 according to the present embodiment explained above is configured to detect the facial orientation or gaze direction of the driver based on the appearance image of the driver, determine that the driver is driving distracted when the facial orientation or gaze direction of the driver is maintained in a range outside the allowable range as the facial orientation or gaze direction of the driver for a predetermined time or longer; and, when the driving mode is the second driving mode, increase the allowable range, increase the predetermined time, or increase the allowable range and the predetermined time, compared to when the driving mode is the first driving mode.

Due to this, similar to the first embodiment, when the driving mode is set to the second driving mode for rough road driving, the notification regarding distracted driving is prevented. Therefore, it is possible to prevent excessive notifications to the driver regarding distracted driving in a situation where the driver must drive while checking the surroundings at a low speed for safety. Additionally, if the facial orientation or gaze direction of the driver remains in an unnaturally fixed position for an extended period, the notification regarding distracted driving can be issued to the driver. Therefore, unnecessary notifications about distracted driving are prevented, preventing the driver from feeling annoyed by such notifications. Consequently, it is possible to prevent unnecessary notifications regarding distracted driving and prevent the driver from feeling annoyed by the notification regarding distracted driving.

Above, an embodiment of the present disclosure was explained, but the embodiment just shows one of the applications of the present disclosure. It is not intended to limit the technical scope of the present disclosure to the specific configuration of the above embodiment.

For example, in the above embodiment, the computer program run in the monitoring control device 4 may be provided in a form recorded in a computer readable portable recording medium such as a semiconductor memory, magnetic recording medium, or optical recording medium and provided as a computer program product.

The invention claimed is:

1. A driver assistance control device for a vehicle capable of selecting one driving mode from among a plurality of driving modes including a first driving mode for normal driving and a second driving mode for rough road driving, wherein the driver assistance control device is configured to:
monitor a driver of the vehicle and perform a notification regarding distracted driving to the driver; and,
when the driving mode is the second driving mode, prevent the notification regarding distracted driving compared to when the driving mode is the first driving mode.

2. The driver assistance control device according to claim 1, configured to, when the driving mode is the second driving mode, prevent the notification regarding distracted driving compared to when the driving mode is the first driving mode by stopping the notification regarding distracted driving.

3. The driver assistance control device according to claim 1, configured to:
detect a facial orientation or a gaze direction of the driver based on an appearance image of the driver;
determine that the driver is driving distracted when the facial orientation or the gaze direction of the driver is maintained in a range outside an allowable range as the facial orientation or the gaze direction of the driver for a predetermined time or longer; and,
when the driving mode is the second driving mode, increase the allowable range, increase the predetermined time, or increase the allowable range and the predetermined time, compared to when the driving mode is the first driving mode.

4. A driver assistance method for a vehicle capable of selecting one driving mode from among a plurality of driving modes including a first driving mode for normal driving and a second driving mode for rough road driving, wherein
the driver assistance control method comprises:
monitoring a driver of the vehicle and performing a notification regarding distracted driving to the driver; and,
when the driving mode is the second driving mode, preventing the notification regarding distracted driving compared to when the driving mode is the first driving mode.

5. A non-transitory computer storage medium including a computer program for making a computer run processing for:
monitoring a driver of a vehicle capable of selecting one driving mode from among a plurality of driving modes including a first driving mode for normal driving and a second driving mode for rough road driving and performing a notification regarding distracted driving to the driver; and,
when the driving mode is the second driving mode, preventing the notification regarding distracted driving compared to when the driving mode is the first driving mode.

* * * * *